United States Patent
Kumar et al.

(10) Patent No.: US 10,704,943 B2
(45) Date of Patent: Jul. 7, 2020

(54) MASS FLOW METER ACCORDING TO THE CORIOLIS PRINCIPLE AND METHOD FOR DETERMINING A MASS FLOW

(71) Applicant: Endress+Hauser Flowtec AG, Reinach (CH)

(72) Inventors: Vivek Kumar, Allschwil (CH); Alfred Rieder, Landshut (DE); Simon Triebenbacher, Aesch (CH)

(73) Assignee: Endress+Hauser Flowtec AG, Reinach (CH)

( * ) Notice: Subject to any disclaimer, the term of this patent is extended or adjusted under 35 U.S.C. 154(b) by 0 days.

(21) Appl. No.: 16/471,634

(22) PCT Filed: Dec. 8, 2017

(86) PCT No.: PCT/EP2017/082035
§ 371 (c)(1),
(2) Date: Aug. 30, 2019

(87) PCT Pub. No.: WO2018/114402
PCT Pub. Date: Jun. 28, 2018

(65) Prior Publication Data
US 2019/0383657 A1   Dec. 19, 2019

(30) Foreign Application Priority Data
Dec. 23, 2016 (DE) .......... 10 2016 125 537

(51) Int. Cl.
*G01F 1/84* (2006.01)
*G01F 25/00* (2006.01)

(52) U.S. Cl.
CPC .......... *G01F 1/8436* (2013.01); *G01F 1/8431* (2013.01); *G01F 1/8477* (2013.01); *G01F 25/0007* (2013.01)

(58) Field of Classification Search
CPC .................................. G01F 1/84; G01F 25/00
See application file for complete search history.

(56) References Cited

U.S. PATENT DOCUMENTS

| | | | |
|---|---|---|---|
| 9,551,604 B2 * | 1/2017 | Hayashi .................... | G01F 1/74 |
| 2007/0193373 A1 * | 8/2007 | Xie ....................... | B01F 5/0682 |
| | | | 73/863.03 |

(Continued)

FOREIGN PATENT DOCUMENTS

| | | |
|---|---|---|
| EP | 1659377 A1 | 5/2006 |
| EP | 1847813 A2 | 10/2007 |

(Continued)

OTHER PUBLICATIONS

Werzner, E., Ray, S. and Trimis, D., Proposed method for measurement of flow rate in turbulent periodic pipe flow, 13th European Turbulence Conference (ETC13), Journal of Physics: Conference Series 318 (2011), 9 pp.

*Primary Examiner* — Jewel V Dowtin
(74) *Attorney, Agent, or Firm* — Christopher R. Powers; PatServe (57) ABSTRACT

The present disclosure relates to a Coriolis mass flow meter including: a measuring tube; an one exciter for generating vibrations in the measuring tube; two sensors for detecting the vibrations in the measuring tube and for outputting associated sensor signals; and an operating and evaluating unit for determining a mass flow value of a medium in the measuring tube based on a phase difference or time difference between the sensor signals, wherein for Reynolds numbers below a Reynolds number threshold a cross-sensitivity to a viscosity of the medium correlates with a Stokes number, wherein the operating and evaluating unit is configured to determine a current value of the Stokes number for Reynolds numbers below the lower Reynolds number (Continued)

threshold and to compensate for the influence of the cross-sensitivity in the determining of the mass flow.

17 Claims, 4 Drawing Sheets

(56) References Cited

U.S. PATENT DOCUMENTS

| | | |
|---|---|---|
| 2009/0312962 A1 | 12/2009 | Uensal et al. |
| 2010/0134304 A1* | 6/2010 | Weinstein ................. G01F 1/74 |
| | | 340/632 |
| 2011/0036179 A1 | 2/2011 | Weinstein |
| 2016/0334316 A1* | 11/2016 | Cage ...................... G01N 9/002 |

FOREIGN PATENT DOCUMENTS

| | | |
|---|---|---|
| WO | 0036379 A1 | 6/2000 |
| WO | 2000036379 A1 | 6/2000 |
| WO | 2008147408 A1 | 12/2008 |
| WO | 2009134827 A1 | 11/2009 |
| WO | 2011068500 A1 | 6/2011 |

* cited by examiner

MASS FLOW METER ACCORDING TO THE CORIOLIS PRINCIPLE AND METHOD FOR DETERMINING A MASS FLOW

CROSS-REFERENCE TO RELATED APPLICATION

The present application is related to and claims the priority benefit of German Patent Application No. 10 2016 125 537.8, filed on Dec. 23, 2016 and International Patent Application No. PCT/EP2017/082035, filed on Dec. 8, 2017, the entire contents of which are incorporated herein by reference.

TECHNICAL FIELD

The present invention relates to a mass flow meter based upon the Coriolis principle and a method for determining a mass flow.

BACKGROUND

Mass flow meters conforming to this type include: at least one vibrating measuring tube for guiding a medium whose flow rate is to be measured; at least one exciter for bringing about vibrations in the measuring tube; at least two sensors for detecting the vibrations in the measuring tube, and for outputting first and second sensor signals that depend upon the vibrations; and at least one operating and evaluating unit for driving the exciter, to detect the sensor signals and to determine a mass flow measurement value on the basis of a phase difference between the sensor signals that is, on a first approximation, proportional to the mass flow.

It is known that the phase difference or time difference of the sensor signals has a cross-sensitivity to the viscosity of the medium. WO 2011/068500 A1, EP 1 659 377 A1, and WO 2000/36379 A1 describe mass flow meters whose operating and evaluating unit is configured to determine the viscosity of the measuring medium and to carry out a correction of this cross-sensitivity as a function of the Reynolds number. Although these approaches can produce useful results for Reynolds numbers greater than 500, they leave much to be desired for smaller Reynolds numbers. With increasing miniaturization in particular, there is therefore a need for measurement recordings that can provide a remedy in this regard. Therefore, it is the aim of the present invention to provide such a sensor and a corresponding method.

SUMMARY

The aim is achieved according to the invention by the mass flow meter according to the independent claim 1 and the method according to the independent claim 7. Further embodiments of the invention result from the dependent claims.

The mass flow meter in accordance with the invention according to the Coriolis principle comprises the following:

at least one vibrating measuring tube for guiding a medium whose flow rate is to be measured;

at least one exciter for bringing about vibrations in the measuring tube;

at least two sensors for detecting the vibrations in the measuring tube and for outputting first and second sensor signals that depend upon the vibrations;

and at least one operating and evaluating unit for driving the exciter, to detect the sensor signals and to determine a mass flow measurement value on the basis of a phase difference or time difference between the sensor signals that is, on a first approximation, proportional to the mass flow;

wherein the vibration behavior of the measuring tube has a cross-sensitivity to the viscosity of the medium, wherein, for Reynolds numbers at least below a lower Reynolds number threshold, the cross-sensitivity correlates with a Stokes number, characterized in that the operating and evaluating unit is configured to determine, at least for Reynolds numbers below the lower Reynolds number threshold, a current value of the Stokes number as a function of a diameter of the measuring tube, of a characteristic oscillation frequency of the measuring tube, and of a viscosity of the medium flowing in the medium, wherein the Stokes number is a gauge for a depth of penetration of the vibrations from the measuring tube into the medium, and wherein the operating and evaluating unit is configured to compensate for the influence of the cross-sensitivity as a function of the current value of the Stokes number in determining the mass flow, wherein the vibration behavior of the measuring tube, which has the cross-sensitivity correlating with the Stokes number, comprises the phase difference or time difference of the sensor signals.

In an additional embodiment of the invention, the operating and evaluating circuit is configured to determine the Stokes number as a function of the kinematic viscosity of a medium flowing in the measuring tube, in particular, a monotonic function of viscosity, e.g., a function of the root of viscosity.

In an additional embodiment of the invention, the characteristic oscillation frequency is equal to the current excitation frequency, in particular, a flexural vibration useful mode.

In an additional embodiment of the invention, the characteristic oscillation frequency is a natural frequency of the measuring tube in a flexural vibration useful mode for a medium with a characteristic density.

In an additional embodiment of the invention, the characteristic density is selected from a current density of the medium in the measuring tube, a density of the medium in the measuring tube averaged over a temperature range and/or a pressure range, or a reference density.

In an additional embodiment of the invention, the operating and evaluating unit is configured to determine a viscosity measured value for the medium flowing in the measuring tube on the basis of a damping of a measuring tube oscillation, in particular on the basis of a ratio between a signal representing an exciter current and a signal representing an oscillation amplitude.

In an additional embodiment of the invention, the operating and evaluating unit is configured to determine a viscosity measured value for the medium flowing in the measuring tube on the basis of a relationship between, on the one hand, a phase angle of a measuring tube oscillation in the flexural vibration useful mode related to the exciter signal and, on the other, the ratio between the exciter frequency belonging to the phase angle and the current natural frequency of the measuring tube.

In an additional embodiment of the invention, the operating and evaluating unit is configured to determine a density measured value for the medium on the basis of a natural frequency of the measuring tube in the flexural vibration useful mode.

In an additional embodiment of the invention, the operating and evaluating unit is configured to compensate for the influence of cross-sensitivity by means of a polynomial, a linear function, a logarithmic function, or another monotonic function of the Stokes number.

In an additional embodiment of the invention, the lower Reynolds number threshold is not more than 1,000, in particular, not more than 100 and, if applicable, not more than 10.

In an additional embodiment of the invention, the operating and evaluating unit is configured to compensate for the influence of cross-sensitivity as a function of the current value of the Stokes number at least for Stokes numbers above a lower threshold of the Stokes number when determining the mass flow, wherein the lower threshold of the Stokes number is, for example, 0.05 or 0.1.

The method according to the invention serves to determine a mass flow with a mass flow meter according to the Coriolis principle, in particular according to one of the preceding claims, which mass flow meter comprises the following: at least one measuring tube, which can vibrate, for guiding a medium whose flow rate is to be measured; at least one exciter for bringing about vibrations in the measuring tube; at least two sensors for detecting the vibrations in the measuring tube and for outputting first and second sensor signals that depend upon the vibrations; and at least one operating and evaluating unit for driving the exciter, in order to detect the sensor signals and to determine a mass flow measurement value on the basis of a phase difference or time difference between the sensor signals that is, on a first approximation, proportional to the mass flow; wherein the vibration behavior of the measuring tube has a cross-sensitivity to the viscosity of the medium, wherein, for Reynolds numbers at least below a lower Reynolds number threshold, the cross-sensitivity correlates with a Stokes number.

The method according to the invention comprises the following steps: driving the exciter to bring about vibrations; detecting the sensor signals; determination of a phase difference or time difference between the sensor signals; determination of a mass flow measurement value on the basis of the phase difference or time difference, which is, on a first approximation, proportional to the mass flow; characterized in that at least for Reynolds numbers below the lower Reynolds number threshold, a current value of the Stokes number is determined as a function of a diameter of the measuring tube, of a characteristic oscillation frequency of the measuring tube, and of a viscosity of the medium flowing in the medium, wherein the Stokes number is a gauge for a depth of penetration of the oscillating vibrations from the measuring tube into the medium, and wherein the influence of the cross-sensitivity is compensated for as a function of the current value of the Stokes number in determining the mass flow, wherein the vibration behavior of the measuring tube, which has the cross-sensitivity correlating with the Stokes number, comprises the phase difference or time difference of the sensor signals.

In an additional embodiment of the invention, the Stokes number is determined as a function of the kinematic viscosity of a medium flowing in the measuring tube, in particular as a monotonic function of the kinematic viscosity, e.g., as a function of the root of the kinematic viscosity.

In an additional embodiment of the invention, the characteristic oscillation frequency is a natural frequency of a measuring tube oscillation for a medium with a characteristic density, wherein the characteristic density is selected from a current density of the medium located in the measuring tube, a density of the medium located in the measuring tube averaged over a temperature range and/or a pressure range, or a reference density.

In an additional embodiment of the invention, the measured viscosity value for the medium flowing in the measuring tube is determined by damping a measuring tube oscillation, in particular on the basis of a ratio between a signal representing an exciter current and a signal representing an oscillation amplitude.

In an additional embodiment of the invention, a viscosity measured value for the medium flowing in the measuring tube is determined on the basis of a relationship between, on the one hand, a phase angle of a measuring tube oscillation in the flexural vibration useful mode related to the exciter signal and, on the other, the ratio between the exciter frequency belonging to the phase angle and the current natural frequency of the measuring tube.

In an additional embodiment of the invention, the influence of cross-sensitivity is compensated for by a polynomial, a linear function, a logarithmic function, or another monotonic function of the Stokes number.

In an additional embodiment of the method according to the invention, the medium flowing in the measuring tube is a homogeneous medium, which, in particular, is free of solids or free bubbles, which are accelerated by the measuring tube vibrations relative to a liquid phase of the medium.

BRIEF DESCRIPTION OF THE DRAWINGS

The invention will now be disclosed on the basis of the exemplary embodiments shown in the drawings. The following are shown:

FIG. 4a shows a representation of an exemplary embodiment of a mass flow meter according to the present disclosure;

FIG. 4b shows a detailed view of the exemplary embodiment from FIG. 4a;

Figure 1A:
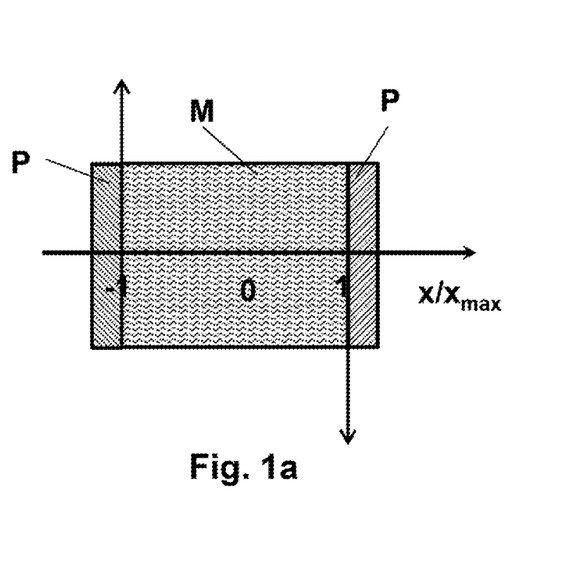
FIG. 1a shows a sketch of vibrations of plane-parallel plates, between which a medium is located.
Figure 1B:
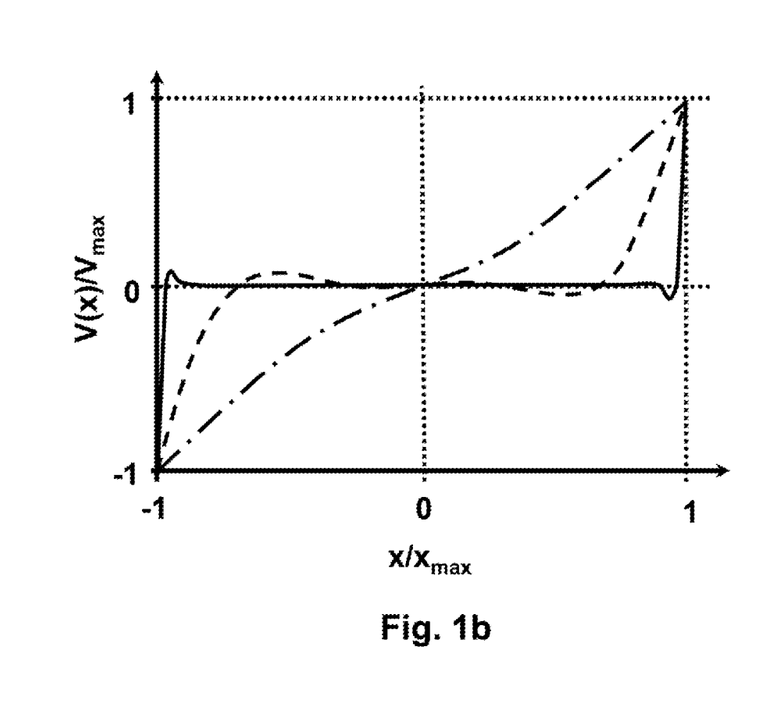
FIG. 1b shows a diagram showing a depth of penetration of vibrations into a medium as a function of the kinematic viscosity.
Figure 1C:
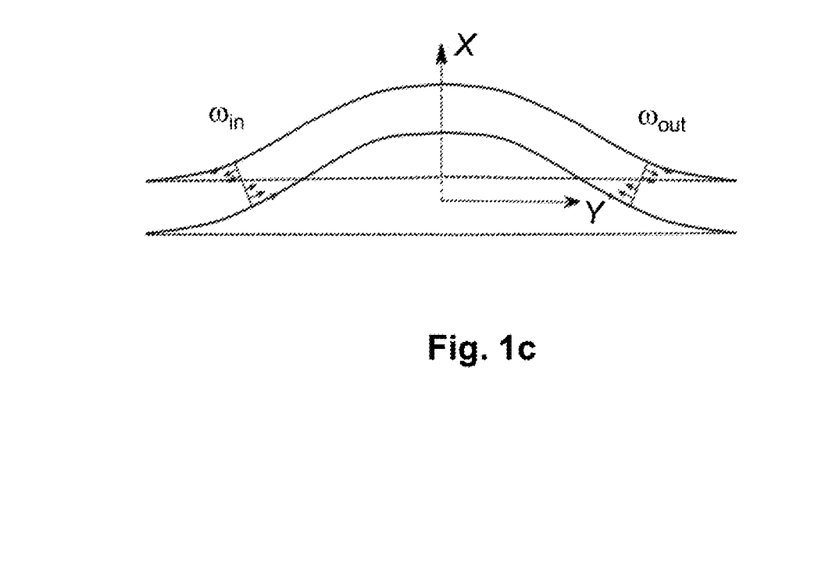
FIG. 1c shows a sketch of shear movements in a measuring tube.

In order to motivate the problem underlying the invention and the solution approach according to the invention, reference is initially made to FIGS. 1a through 1c. FIG. 1a shows two plane-parallel plates P that enclose a non-flowing medium M and carry out vibrations with a maximum velocity $V_{max}$ in opposite phase to each other at a constant distance. As a function of the viscosity of the medium, the vibrations are transmitted into the medium at different distances, as shown in FIG. 1b for a plate distance of a few centimeters and a maximum velocity of the vibrations on the order of 1 m/s. The solid line shows the velocity distribution for a medium with a kinematic viscosity of approximately 1 cSt. Here, only a thin boundary layer of the medium is moved. The dotted line and the dot-dashed line apply to kinematic viscosities of approximately 100 cSt and approximately 1,000 cSt respectively. It can be clearly seen how, with increasing viscosity, the vibrations penetrate further and further into the medium as shear oscillations, and thus release vibration energy to the medium, thereby damping the oscillations of the plates. A gauge of a depth of penetration of the vibrations is a Stokes number St, which is given, for example, as $$St = \frac{\sqrt{v/f}}{D}$$

wherein v is the kinematic viscosity of the medium, f is the frequency of the vibrations, and D indicates the plate spacing.

DETAILED DESCRIPTION

FIG. 1c schematically shows a measuring tube of a mass flow meter, which is excited in the X-direction to flexural vibrations in the so-called $f_1$ mode or useful mode. The arrows at $\omega_{in}$ and $\omega_{out}$ indicate, by way of example, a resulting shear rate distribution as it might occur in a medium contained in the measuring tube. In the case of a stationary medium, this leads only to a damping of the symmetrical flexural vibration useful mode. However, if the medium flows, the antisymmetric $f_2$ mode or Coriolis mode is excited out of resonance at the useful frequency $f_1$. The superposition of the antisymmetric with the symmetrical flexural vibration useful mode leads to symmetry breaks in the velocity distribution in the medium, and thus to cross-sensitivities of the vibration behavior that go beyond uniform damping, in particular, to a cross-sensitivity of the phase relationship between typical vibration sensor signals of a mass flow meter according to the Coriolis principle, on the basis of which the mass flow is determined. While this effect may be negligible for larger Reynolds numbers, such as Re>1,000, it is significant for smaller Reynolds numbers, such as Re<100, and can cause relative measurement errors of more than 1%.

Figure 2:
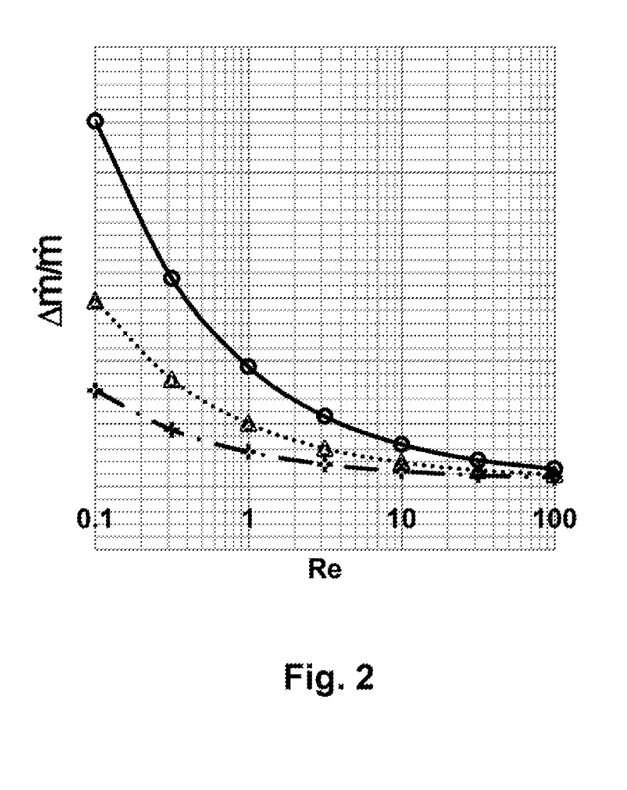
FIG. 2 shows a diagram showing a relative mass flow measurement error for various flow velocities above the Reynolds number.

FIG. 2 shows typical relative measurement errors $\Delta\dot{m}/\dot{m}$ above the Reynolds number Re for a mass flow meter neglecting the above effect. The crosses represent data for a first flow velocity of media in the measuring tube. The triangles represent data for a second flow velocity of media in the measuring tube that is four times the first flow velocity. The circles represent data for a third flow velocity of media in the measuring tube that is four times the second flow velocity. The first flow velocity is less than 1 m/s, while the second flow velocity is greater than 1 m/s. The Reynolds number, for this effect, is unsuitable as a basis for correction.

Figure 3:
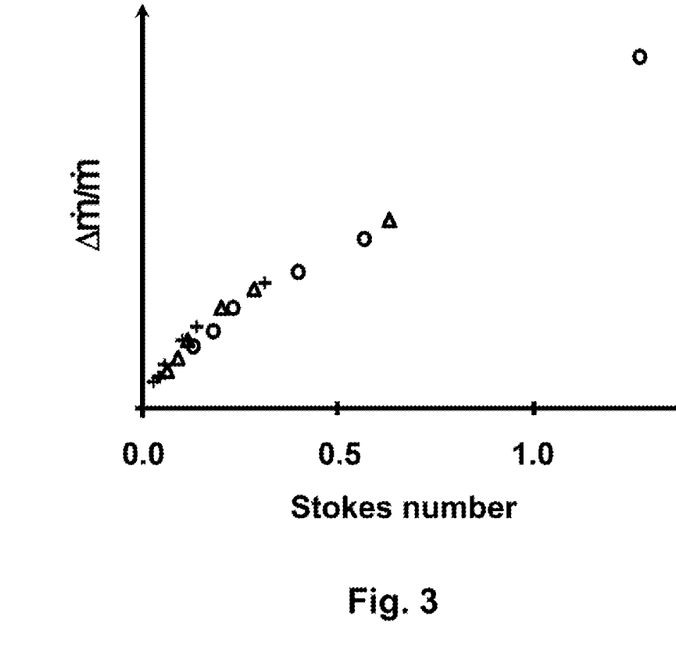
FIG. 3 shows a diagram showing a relative mass flow measurement error for various flow velocities as a function of the Stokes number.

FIG. 3 shows typical relative mass flow measurement errors $\Delta\dot{m}/\dot{m}$ above the Stokes number for the flow velocities from FIG. 2, wherein the symbols have corresponding meanings with respect to the velocities. The relative measurement error increases monotonically with the Stokes number, and the correlation between the relative measurement error and the Stokes number appears essentially independent of the flow velocity or Reynolds number of the medium. Thus, an approach for compensating for the cross-sensitivity of the vibrations has been found. The method according to the invention is further explained below.

Figures 4A, 4B:
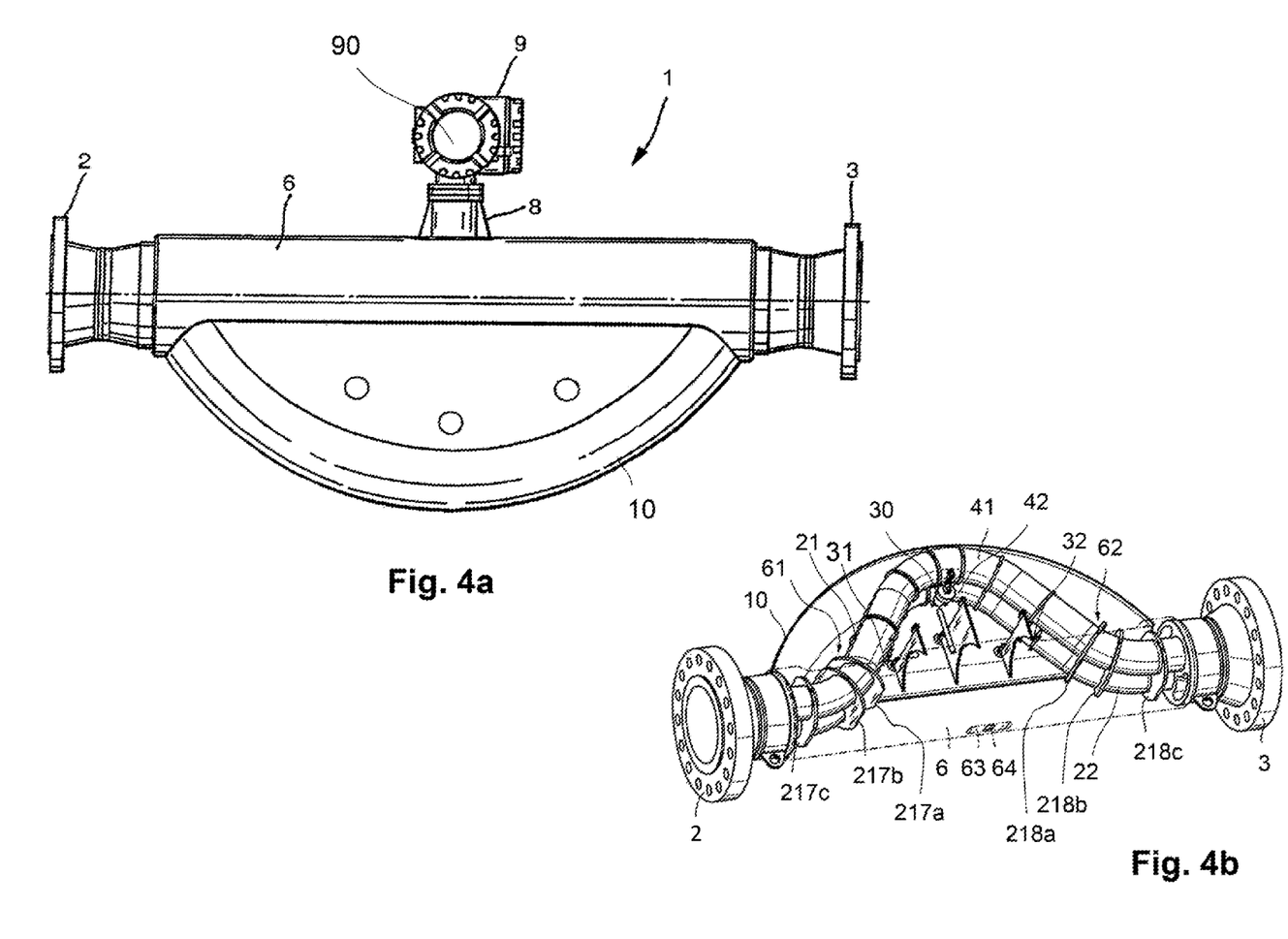

The exemplary embodiment of a mass flow meter 1 according to the invention shown in FIGS. 4a and 4b includes a first connecting flange 2 and a second connecting flange 3 for installation in a pipeline. Each of the flanges 2, 3 has a collector, which are connected to each other by a rigid carrier pipe 6. From the carrier pipe 6 extends to the side a meter housing 10 in which two curved measuring tubes 21, 22 run, the ends of which are combined on both sides in one collector. The carrier pipe 6 has two lateral openings 61, 62, through which the measuring tubes 21, 22 are guided out of the carrier pipe 6 and back in again. The measuring tubes 21, 22 are coupled near the two collectors, each with some node plates 217a, 217b, 217c, 218a, 218b, 218c, which determine the vibration behavior of the pair of measuring tubes. To bring about flexural vibrations, an electrodynamic exciter 30 is arranged centrally between the two measuring tubes 21, 22 in the area of vertex arcs 41, 42 of the measuring tubes. Between the vertex arcs 41, 42 and the next node plates 217a, 218a respectively, a first electrodynamic vibration sensor 31 and a second electrodynamic vibration sensor 32 are arranged, symmetrically to the vertex arcs, between the two measuring tubes 21, 22, in order to detect the measuring tube vibrations. The carrier pipe 6 has, in a mounting surface 63, an electrical feedthrough 64, through which signal lines (not shown here) are guided. A connection adapter 8 with a transducer 9, which contains an operating and evaluating circuit 90, is connected to the mounting surface 63. The operating and evaluating circuit 90 is connected via the signal lines to the exciter 30 and the vibration sensors 31, in order to drive the exciter 30 and to detect and evaluate the signals of the latter, in order to determine a mass flow measured value by means of the method according to the invention, which can be output via signal and supply lines of the transducer 9.

Figure 5A:
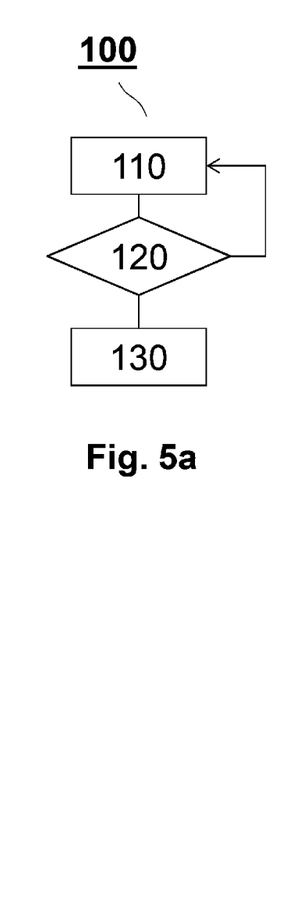
FIG. 5a shows a flow chart of an exemplary embodiment of a method according to the present disclosure.

As shown in FIG. 5a, in a preferred exemplary embodiment of the method 100 according to the invention, in a first step 110, a preliminary mass flow measurement value is first generated, which can include the compensation for other interferences if necessary.

In a second step 120, a test is performed to determine whether a critical Reynold number $Re_{crit}$ of, for example, $Re_{crit}=100$ has been undershot.

If yes, in a third step 130, compensation for the cross-sensitivity to the Stokes number then takes place; otherwise, the method starts again with the first step 110.

Figures 5B, 5C:
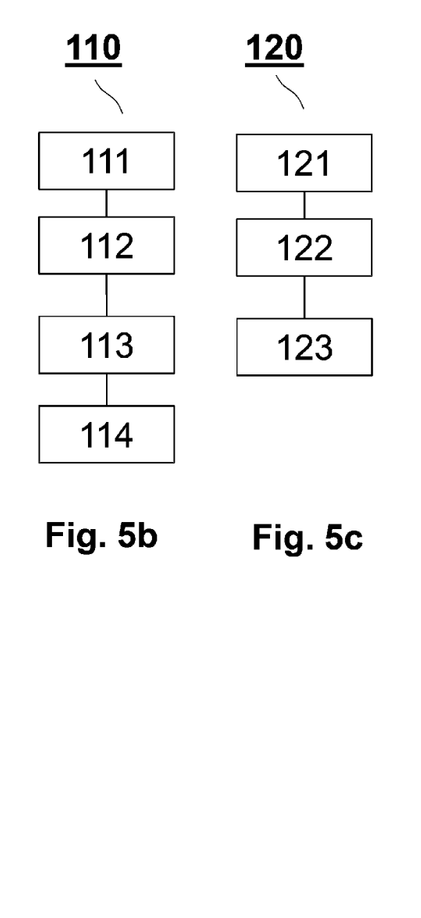
FIG. 5b shows a flow chart of a first detail of an exemplary embodiment of a method according to the present disclosure.
FIG. 5c shows a flow chart of a second detail of an exemplary embodiment of a method according to the present disclosure.

The first step 110 can contain, for example, the substeps shown in FIG. 5b. The first step begins with driving the exciter 111 to bring about vibrations. The sensor signals 112 of the two vibration sensors are then detected. This is followed by determining a phase difference or time difference 113 between the sensor signals. On the basis of the determined phase difference or time difference, a preliminary mass flow measurement value 114, which, to a first approximation, is proportional to the phase difference or time difference, is finally determined.

The second step 120 requires (if not yet available) the determination of the current Reynolds number. For this purpose, first, a current viscosity measured value 121 is determined from the ratio of an excitation current signal with which the exciter is fed and the amplitude of the signals of the vibration sensors. A current value Re of the Reynolds number 122 based upon the provisional mass flow measurement value $\dot{m}$, and the viscosity measurement value q according to $Re=\dot{m}/(\eta\pi R)$, where R is the radius of a measuring tube, are then calculated. This is followed by the check 123 of whether the current value of the Reynolds number Re falls below the critical Reynolds number $Re_{crit}$.

Figure 5D:
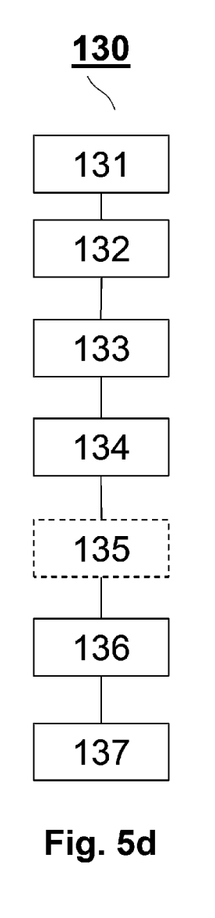
FIG. 5d shows a flow chart of a third detail of an exemplary embodiment of a method according to the present disclosure.

The third step 130 comprises in detail, as shown in FIG. 5d, determining a current natural frequency value f of a flexural vibration mode 131, determining a density measurement value of the medium 132 contained in the measuring tube from the natural frequency value, calculating a value for kinematic viscosity v 133 on the basis of the viscosity measurement value η and of the density measurement value ρ according to v=η/ρ. This is followed by the calculation of the Stokes number St 134 according to $$St = \frac{\sqrt{v/f}}{R}.$$

In an optional step 135, there can be a check of whether the Stokes number St exceeds at least one of a critical value $St_{crit}$ of, for example, $St_{crit}$=0.05. If not, compensation may be dispensed with, because its effect is negligible.

The measurement error 136, which depends upon the Stokes number, is determined according to:

$$\frac{\Delta\dot{m}_{St}}{\dot{m}} = C_1 St + C_0,$$

where $C_1$ and $C_2$ are device-specific constants.

The method concludes with the correction 137 of the provisional mass flow measurement value by the measurement error $\Delta\dot{m}_{St}$, which depends upon the Stokes number.

The invention claimed is:

1. A mass flow meter operating according to the Coriolis principle, the mass flow meter comprising:
    a measuring tube having a diameter and configured to guide a medium flowing through the measuring tube at a flow rate to be measured;
    an exciter configured to generate vibrations in the measuring tube;
    at least two sensors configured to detect the vibrations in the measuring tube and to output first and second sensor signals, respectively, that depend upon the vibrations; and
    an operating and evaluating unit configured to drive the exciter, to detect the first and second sensor signals and to determine a mass flow value based on a phase difference or a time difference between the first and second sensor signals, wherein the phase difference or the time difference is proportional to the mass flow on a first approximation,
    wherein the vibrations of the measuring tube have a cross-sensitivity to a viscosity of the medium, wherein for Reynolds numbers at least below a lower Reynolds number threshold, the cross-sensitivity correlates with a Stokes number, and
    wherein the operating and evaluating unit is configured to determine, at least for Reynolds numbers below the lower Reynolds number threshold, a current value of the Stokes number as a function of:
        the diameter of the measuring tube;
        a characteristic oscillation frequency of the measuring tube; and
        the viscosity of the medium flowing in the medium, wherein the Stokes number is a gauge for a depth of penetration of the vibrations from the measuring tube into the medium, and
    wherein the operating and evaluating unit is further configured to compensate for an influence of the cross-sensitivity as a function of the current value of the Stokes number in determining the mass flow value, wherein the vibrations of the measuring tube, which have the cross-sensitivity correlating with the Stokes number, includes the phase difference or time difference of the first and second sensor signals.

2. The mass flow meter of claim 1, wherein the operating and evaluating unit is further configured to determine the Stokes number as a function of a kinematic viscosity of the medium flowing in the measuring tube.

3. The mass flow meter of claim 2, wherein the operating and evaluating unit is configured to determine the Stokes number as a monotonic function of the kinematic viscosity of the medium flowing in the measuring tube.

4. The mass flow meter of claim 1, wherein the characteristic oscillation frequency is equal to a current excitation frequency.

5. The mass flow meter of claim 4, wherein the characteristic oscillation frequency is a natural frequency of a measuring tube oscillation for a medium having a characteristic density, wherein the characteristic density is selected from a current density of the medium in the measuring tube, a density of the medium in the measuring tube averaged over a temperature range and/or a pressure range, or a reference density.

6. The mass flow meter of claim 1, wherein the characteristic oscillation frequency is equal to a flexural vibration useful mode.

7. The mass flow meter of claim 1, wherein the operating and evaluating unit is configured to determine a viscosity measured value for the medium flowing in the measuring tube based on a damping of a measuring tube oscillation.

8. The mass flow meter of claim 7, wherein the operating and evaluating unit is configured to determine a viscosity measured value for the medium flowing in the measuring tube based on a ratio between a signal representing an exciter power and a signal representing an oscillation amplitude.

9. The mass flow meter of claim 1, wherein the operating and evaluating unit is configured to compensate for the influence of the cross-sensitivity using a polynomial, a linear function, a logarithmic function, or another monotonic function of the Stokes number.

10. A method for determining a mass flow rate with a mass flow meter operating according to the Coriolis principle, the method comprising:
    providing a mass flow meter comprising:
        a measuring tube having a diameter and configured to guide a medium flowing through the measuring tube at a mass flow rate to be measured;
        an exciter configured to generate vibrations in the measuring tube;
        at least two sensors configured to detect the vibrations in the measuring tube and to output first and second sensor signals, respectively, that depend upon the vibrations; and
        an operating and evaluating unit configured to drive the exciter, to detect the first and second sensor signals and to determine a mass flow value based on a phase difference or a time difference between the first and second sensor signals, wherein the phase difference or the time difference is proportional to the mass flow on a first approximation, wherein the vibrations of the measuring tube have a cross-sensitivity to a viscosity of the medium, wherein for Reynolds numbers at least below a lower Reynolds number threshold, the cross-sensitivity correlates with a Stokes number;

driving the exciter to generate the vibrations in the measuring tube;

detecting the first and second sensor signals;

determining the phase difference or time difference between the first and second sensor signals; and determining the mass flow value based on the phase difference or the time difference, which is, on a first approximation, proportional to the mass flow, wherein, at least for Reynolds numbers below the lower Reynolds number threshold, a current value of the Stokes number is determined as a function of the diameter of the measuring tube, a characteristic oscillation frequency of the measuring tube, and a viscosity of the medium flowing in the measuring tube, wherein the Stokes number is a gauge for a depth of penetration of the oscillating vibrations from the measuring tube into the medium, and wherein the influence of the cross-sensitivity is compensated for as a function of the current value of the Stokes number in determining the mass flow, wherein the vibration behavior of the measuring tube, which has the cross-sensitivity correlating with the Stokes number, includes the phase difference or time difference of the first and second sensor signals.

11. The method of claim 10, wherein the Stokes number is determined as a monotonic function of a kinematic viscosity of the medium.

12. The method of claim 10, wherein the characteristic oscillation frequency is equal to a current excitation frequency.

13. The method of claim 10, wherein the characteristic oscillation frequency is a natural frequency of a measuring tube oscillation for a medium having a characteristic density, wherein the characteristic density is selected from a current density of the medium in the measuring tube, a density of the medium in the measuring tube averaged over a temperature range and/or a pressure range, or a reference density.

14. The method of claim 10, wherein a viscosity measured value for the medium flowing in the measuring tube is determined based on a damping of a measuring tube oscillation.

15. The method of claim 14, wherein a viscosity measured value for the medium flowing in the measuring tube is determined based on a ratio between a signal representing an exciter current and a signal representing an oscillation amplitude.

16. The method of claim 10, wherein the influence of the cross-sensitivity is compensated for by a polynomial, a linear function, a logarithmic function, or another monotonic function of the Stokes number.

17. The method of claim 10, wherein the medium flowing in the measuring tube is a homogeneous medium free of solids or free bubbles, which are accelerated by the measuring tube vibrations relative to a liquid phase of the medium.

* * * * *